United States Patent [19]

Miyakawa et al.

[11] 4,311,779

[45] Jan. 19, 1982

[54] DEVELOPER FOR DEVELOPING ELECTROSTATIC LATENT IMAGES

[75] Inventors: Nobuhiro Miyakawa, Kobe; Takashi Teshima, Amagasaki, both of Japan

[73] Assignee: Mita Industrial Company Limited, Osaka, Japan

[21] Appl. No.: 97,981

[22] Filed: Nov. 28, 1979

[30] Foreign Application Priority Data

Nov. 28, 1978 [JP] Japan ............................ 53-145966

[51] Int. Cl.$^3$ ........................ G03G 9/00; C04B 35/64

[52] U.S. Cl. .................................. 430/107; 430/109; 430/903; 430/904; 252/62.53; 252/62.54

[58] Field of Search ............... 430/107, 109, 903, 904, 430/122; 252/62.53, 62.54

[56] References Cited

U.S. PATENT DOCUMENTS

| | | | |
|---|---|---|---|
| 3,239,465 | 3/1966 | Rheinfrank | 430/903 |
| 3,697,268 | 10/1972 | Ohta | 430/107 |
| 3,901,695 | 8/1975 | Shelffo | 430/122 |
| 3,965,022 | 6/1976 | Strong | 430/109 |
| 4,175,962 | 11/1979 | Sadamatsu | 430/109 |
| 4,187,330 | 2/1980 | Harada | 430/122 |
| 4,192,902 | 3/1980 | Lu | 430/107 |

*Primary Examiner*—Mary F. Downey
*Attorney, Agent, or Firm*—Sherman & Shalloway

[57] ABSTRACT

Disclosed is a one-component type magnetic developer which comprises a binder medium and 45 to 65% by weight, based on the total developer, of fine particles of a magnetic material dispersed in the binder medium, the binder medium comprising a homopolymer of an aromatic vinyl monomer or a copolymer of (a) at least one aromatic vinyl monomer with (b) at least one mono- or di-ethylenically unsaturated monomer other than the aromatic vinyl monomer and having a weight average molecular weight of 75,000 to 150,000, wherein the electrostatic capacity as determined under conditions of an electrode spacing of 0.65 mm, an electrode sectional area of 1.43 $cm^2$ and an electrode load of 105 $g/cm^2$ is 7.8 to 11.7 PF (picofarad), the dielectric constant is 4 to 6 as determined under the above conditions and the electric resistance is at least $5 \times 10^{13}$ Ω-cm as determined under the above conditions.

10 Claims, 1 Drawing Figure

DEVELOPER FOR DEVELOPING ELECTROSTATIC LATENT IMAGES

BACKGROUND OF THE INVENTION (1) Field of the Invention

The present invention relates to a one-component type magnetic developer for use in electrostatic photographic reproduction. More particularly, the present invention relates a one-component type magnetic developer suitable for forming images by developing an electrostatic latent image on a photosensitive plate and transferring the developed image on a transfer sheet.

(2) Description of the Prior Art

As a developer capable of developing an electrostatic latent image without use of a particular carrier, there has been broadly known a so-called one-component type magnetic developer comprising a finely divided magnetic material incorporated in particles of a developer.

As one type of such one-component magnetic developer, there is known a so-called conductive magnetic developer formed by incorporating a finely divided magnetic material into developer particles to impart a property of being magnetically attracted to the developer particles and distributing a conducting agent such as electrically conductive carbon black on the surfaces of the developer particles (see, for example, the specifications of U.S. Pat. Nos. 3,639,245 and 3,965,022). When this conductive magnetic developer is caused to fall in the form of a magnetic brush in contact with an electrostatic latent image-carrying substrate to effect development of the electrostatic latent image, an excellent visible image free of so-called edge effect or fog is obtained. However, it is known that serious problems are caused when the image of this developer is transferred from the substrate to an ordinary transfer sheet. More specifically, as disclosed in Japanese Patent Application Laid-Open Specification No. 117435/75, when the specific resistance of a transfer sheet used is lower than $3\times10^{13}$ Ω-cm as in case of ordinary plain paper, broadening of contours or reduction of the transfer efficiency is caused by scattering of the developer particles at the transfer step. This defect can be moderated to some extent by coating a highly electrically resistant resin, wax or oil on the toner-receiving face of a transfer sheet, but this improving effect is relatively low under high humidity conditions. Furthermore, the cost of transfer sheets is increased by coating of the above-mentioned resin, wax or oil and another defect of reduction of the touch is caused.

As another type of the one-component magnetic developer, there is known a non-conductive one-component magnetic developer comprising particles of a homogeneous mixture of a finely divided magnetic material and an electricity-detecting binder. For example, the specification of U.S. Pat. No. 3,645,770 discloses an electrostatic photographic copying process comprises charging a magnetic brush (layer) of the above-mentioned non-conductive magnetic developer with a polarity reverse to that of an electrostatic latent image to be developed by corona discharge, causing the charged developer to fall in contact with an electrostatic latent image-carrying substrate to develop the latent image and transferring the formed image of the developer to a transfer sheet. This process is advantageous in that a transfer image can be formed on so-called plain paper. However, it is difficult to uniformly charge the magnetic brush of the non-conductive magnetic developer to the deep root thereof and therefore, it is difficult to form an image having a sufficiently high density. Furthermore, since a corona discharge mechanism has to be disposed in a developing zone, this process involves a defect that the structure of the copying apparatus as a whole becomes complicated.

Recently, there has been proposed a process in which development of an electrostatic latent image is performed by utilizing charging of the developer by friction between a non-conductive magnetic developer and the surface of an electrostatic latent image-carrying substrate (see Japanese patent application Laid-Open Specification No. 62638/75) and a process in which development is performed by utilizing dielectric polarization of a non-conductive magnetic developer (see Japanese patent application Laid-Open Specification No. 133026/76).

In the former process, it is necessary to control developing conditions strictly, and if the development conditions are not strictly controlled, fogging is caused in a non-image area (especially conspicuous when the degree of the mutual contact between the surface of the photsensitive material and the tops of spikes of magnetic toner particles is high), and fixation of magnetic toner particles to a developing sleeve and blocking of magnetic toner particles are readily caused and this trouble is especially conspicuous when reproduction is carried out continuously.

In the latter process, the problem of fogging is not caused, but since a visible image is formed by applying to an electrostatic latent image a developing charge by the dielectric polarizing effect induced by the magnetic toner, a low voltage area of the electrostatic latent image is not advantageously developed. Accordingly, a low density portion of the original is not effectively reproduced and formation of a print of a half-tone image is difficult.

Furthermore, both of these two processes are defective in that obtained prints are inferior in the image sharpness, and when a p-type photosensitive material such as selenium is used for a photosensitive plate, images having a high density can hardly be formed according to these processes.

SUMMARY OF THE INVENTION

We found that when a specific copolymer described hereinafter is selected as a resin medium in which a finely divided magnetic material is dispersed and the electrostatic capacity, dielectric constant and electric resistance of developer particles are controlled within specific ranges, the density, sharpness and clearness of transferred images can be remarkably improved.

It is therefore a primary object of the present invention to provide a developer for electrostatic photographic reproduction which can be formed on a transfer sheet of plain paper to provide a transferred image having a high density and being excellent in sharpness, clearness and half-tone reproducing capacity.

Another object of the present invention is to provide a developer for electrostatic photographic reproduction which makes it possible to perform the reproduction operation continuously for a long time without damaging an electrostatic latent image-carrying substrate, especially the surface of a photosensitive layer, and without provision of a particular accessory equipment for development with a one-component type magnetic developer, and which allows the use of uncoated plain paper as a transfer sheet.

In accordance with the present invention, there is provided a one-component type magnetic developer which comprises a binder medium and 45 to 65% by weight, based on the total developer, of fine particles of a magnetic material dispersed in the binder medium, said binder medium comprising a homopolymer of an aromatic vinyl monomer or a copolymer with (a) at least one aromatic vinyl monomer with (b) at least one mono- or di-ethylenically unsaturated monomer other than the aromatic vinyl monomer and having a weight average molecular weight of 75,000 to 150,000, wherein the electrostatic capacity as determined under conditions of an electrode spacing of 0.65 mm, an electrode sectional area of 1.43 $cm^2$ and an electrode load of 105 $g/cm^2$ is 7.8 to 11.7 PF (picofarad), particularly 8 to 11 PF, the dielectric constant is 4 to 6, particularly 4.1 to 5.1, as determined under the above conditions and the electric resistance is at least $5\times10^{13}$ Ω-cm, especially in the range of $1\times10^{14}$ to $1\times10^{16}$ Ω-cm, as determined under the above conditions.

BRIEF DESCRIPTION OF THE DRAWING

The FIGURE illustrates relations between the density of the original and the density of the transferred image, observed with respect to various developers.

DETAILED DESCRIPTION OF THE PREFERRED EMBODIMENTS

Figure 1:
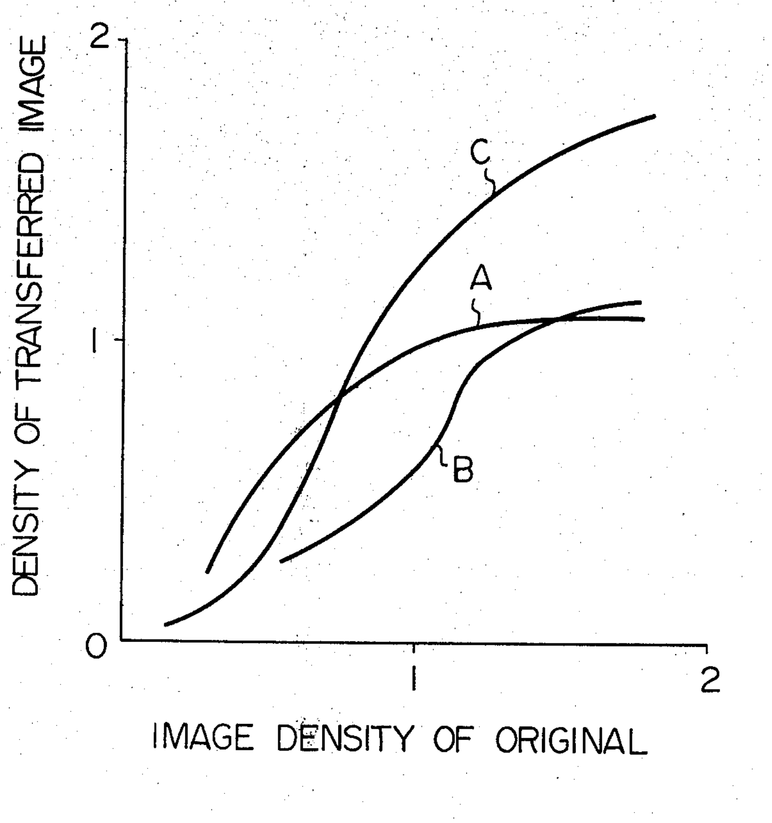

When a magnetic brush (developer particles) of a one-component type magnetic developer is caused to fall in contact with the surface of an electrostatic latent image-carrying substrate, the electrostatic attracting force (coulomb force) caused between the developer particles and the electrostatic latent image and the magnetic attracting force caused between the developer particles and the magnetic brush-forming magnet (developing sleeve) are ordinarily imposed on individual developer particles. Developer particles on which the coulomb force is larger are attracted to the electrostatic latent image, and developer particles on which the magnetic attracting force is larger are attracted to the developing sleeve. Accordingly, development is conducted depending on the charge of the electrostatic latent image.

One of important features of the present invention resides in the finding that when the phenomenon that the quantity of developer particles attracted to the electrostatic latent image of a certain charge is increased as the electrostatic capacity of the developer particles is small is utilized for magnetic brush development and when a specific copolymer, that is, a copolymer comprising at least one aromatic vinyl monomer and at least one mono- or di-ethylenically unsaturated monomer other than the aromatic vinyl monomer and having a weight average molecular weight of 75,000 to 150,000, is incorporated in a binder medium and the dielectric constant of developer particles is controlled within a certain specific range, charging of developer particles can easily be accomplished without any particular means.

More specifically, when the one-component type magnetic developer of the present invention is caused to fall in the form of a magnetic brush in contact with the surface of an electrostatic image-carrying substrate, since the electrostatic capacity of the developer particles is small, the quantity of the developer particles attracted to the electrostatic latent image is increased and, therefore, a developed image having a high density can be formed, and at the transfer step, a transfer image can be formed at a high transfer efficiency.

Moreover, since the dielectric constant of the developer of the present invention is low, individual developer particles can be charged very easily, and since the electrostatic capacity of the developer particles is small, escape of the applied charge is effectively inhibited. These advantages are especially increased by incorporating the above-mentioned copolymer having specific composition and molecular weight in the binder medium. Therefore, when the one-component type developer of the present invention is employed, an excellent image can be obtained without any particular care being taken to the developing device or developing zone.

Still further, since the developer of the present invention has a volume resistivity of at least $5\times10^{13}$ Ω-cm, an image of the developer can be transferred on plain paper which has not been subjected to a particular treatment, without broadening of contours of the image.

More specifically, when the one-component type magnetic developer of the present invention is used, as demonstrated in Examples given hereinafter, the density of the transferred image can be increased by at least 1.8 times and reproduction of the half-tone image becomes possible. Furthermore, these advantages can be attained without occurrence of such troubles as contamination of the background (fogging), edge effect and broadening of contours.

In conventional non-conductive magnetic developers, for development of electrostatic latent images, it is indispensable to forcibly charge developer particles from the outside by corona discharge or the like or to frictionally charge the developer by rotating the magnetic brush of the developer in a direction opposite to the moving direction of the substrate to cause strong sliding contact between the developer and substrate. When the developer of the present invention is used, as demonstrated in Examples given hereinafter, such special operation need not be performed and the obtained image is much excellent over images formed according to the conventional techniques. These facts suggest that only if the developer of the present invention is used in the form of a magnetic brush, desired charging can easily be accomplished.

In the one-component type magnetic developer of the present invention, the above-mentioned electrostatic capacity and dielectric constant are remarkably changed according to the kinds of the finely divided magnetic material and the resin medium in which the magnetic material is dispersed, the content of the magnetic material, the manner of dispersion of the magnetic material and other factors, and it is very difficult to define these factors specifically and independently. However, there are certain critical standard requirements to be satisfied for preparing a developer having the above-mentioned characteristic properties. These requirements will now be described.

First of all, it is necessary that the amount of the finely divided magnetic material to be incorporated into the developer should be 45 to 65% by weight, particularly 50 to 60% by weight, based on the total developer. If the amount of the finely divided magnetic material is larger than 65% by weight, both the electrostatic capacity and dielectric constant exceed the ranges specified in the present invention and it is difficult to obtain a transfer image having a high density. When the amount of the finely divided magnetic material is smaller than 45% by weight, it is difficult to impart to the developer a property of being magnetically attracted sufficiently and the electrostatic capacity and dielectric constant are decreased below the ranges specified in the present invention. As a result, the charging tendency is increased and such troubles as fogging and scattering of the developer are readily caused.

As the finely divided magnetic material, there have heretofore been used triiron tetroxide ($Fe_3O_4$), diiron trioxide ($\gamma$-$Fe_2O_3$), zinc iron oxide ($ZnFe_2O_4$), yttrium iron oxide ($Y_2Fe_5O_{12}$), cadmium iron oxide ($CdFe_2O_4$), gadolinium iron oxide ($Gd_3Fe_5O_{12}$), copper iron oxide ($CuFe_2O_4$), lead iron oxide ($PbFe_{12}O_{19}$), nickel iron oxide ($NiFe_2O_4$), neodium iron oxide ($NdFe_2O_3$), barium iron oxide ($BaFe_{12}O_{19}$), magnesium iron oxide ($MgFe_2O_4$), manganese iron oxide ($MnFe_2O_4$), lanthanum iron oxide ($LaFeO_3$), iron powder (Fe), cobalt powder (Co) and nickel powder (Ni). In the present invention, these known magnetic materials may be used singly or in the form of a mixture of two or more of them. Fine powders of triiron tetroxide and diiron trioxide are especially preferred for attaining the objects of the present invention.

Also the particle size of the finely divided magnetic material has influences on the electrostatic characteristics of the developer. When the particle size of the finely divided magnetic material is too large, the powder of the magnetic material tends to be exposed to the surfaces of the developer particles, and if the particle size of the finely divided magnetic material is too small, the finely divided magnetic material tends to form a so-called chain structure in the developer particles and the electrostatic capacity and dielectric constant are increased. In view of the foregoing, it is preferred to use a finely divided magnetic material having such a particle size distribution that particles having a size larger than 0.5$\mu$ occupy less than 20% of the total particles and particles having a size smaller than 0.3 $\mu$ occupy less than 20% of the total particles. When the finely divided magnetic material is subjected to a coating treatment described in detail hereinafter, it is possible to use a magnetic material having a particle size distribution other than the abovementioned particle size distribution.

In the present invention, it is very important that a copolymer comprising (a) at least one aromatic vinyl monomer and (b) at least one mono- or di-ethylenically unsaturated monomer other than the aromatic vinyl monomer and having a weight average molecular weight ($\overline{M}w$) of 75,000 to 150,000, particularly 78,000 to 140,000, should be incorporated into the binder medium. For example, when a copolymer having a molecular weight lower than 75,000 is used, it is difficult to obtain a sufficient development density, and when the molecular weight of the copolymer is higher than 150,000, the toner-forming property or fixing property is degraded. The copolymer that is used in the present invention is characterized in that it has a molecular weight much higher than that of a resin that has heretofore been used as a binder in conventional developers.

As the aromatic vinyl monomer (a), there are preferably employed monomers represented by the following general formula:

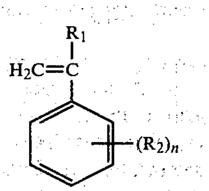

wherein $R_1$ stands for a hydrogen atom, a lower alkyl group having 1 to 4 carbon atoms or a halogen atom, $R_2$ stands for a substituent such as a lower alkyl group or a halogen atom, and n is an integer of up to 2, such as styrene, vinyltoluene, $\alpha$-methylstyrene, $\alpha$-chlorostyrene and vinylxylene, and vinylnaphthalene. Among these monomers, styrene and vinyltoluene are preferred.

Styrene or vinyltoluene may be used in the form of a homopolymer or copolymer.

As the monomer (b) other than the aromatic vinyl monomer, there are preferably employed acrylic monomers represented by the following general formula:

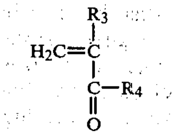

wherein $R_3$ stands for a hydrogen atom or a lower alkyl group, and $R_4$ stands for a hydroxyl group, an alkoxy group, a hydroxyalkoxy group or an aminoalkoxy group, such as acrylic acid, methacrylic acid, ethyl acrylate, methyl methacrylate, butyl acrylate, butyl methacrylate, 2-ethylhexyl acrylate, 2-ethylhexyl methacrylate, 3-hydroxypropyl acrylate, 2-hydroxyethyl methacrylate, 3-aminopropyl acrylate, 3-N,N-diethylaminopropyl acrylate and acrylamide, and conjugated diolefin type monomers represented by the following general formula:

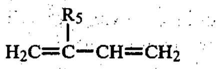

wherein $R_5$ stands for a hydrogen atom, a lower alkyl group or a chlorine atom, such as butadiene, isoprene and chloroprene.

Furthermore, there may be used other ethylenically unsaturated carboxylic acids such as maleic anhydride, fumaric acid, crotonic acid and itaconic acid, esters thereof, vinyl esters such as vinyl acetate, vinyl pyridine, vinyl pyrrolidone, vinyl ethers, acrylonitrile, vinyl chloride and vinylidene chloride.

A resin medium especially suitable for attaining the objects of the present invention is a copolymer comprising (a) at least one aromatic vinyl monomer and (b) at least one member selected from acrylic monomers and conjugated diolefins.

In the binder medium that is used in the present invention, if the content of the aromatic vinyl monomer component is 20 to 95% by weight, particularly 45 to 93% by weight, based on the total binder medium, the objects of the present invention can be attained very advantageously.

As another factor important for maintaining the electrostatic capacity and dielectric constant of the developer within the above-mentioned range, there can be mentioned the state of manner of dispersion of the finely divided magnetic material in the developer particles. As pointed out hereinbefore, it is important that the finely divided magnetic material should be dispersed in the particulate form uniformly in the resin medium. When the finely divided magnetic material is kneaded with the resin medium while the resin medium is softened or molten, the dielectric constant of the formed developer particles is changed according to the kneading time or the degree of kneading, and it has been confirmed that when the kneading operation is conducted for a long time, the dielectric constant is reduced.

Therefore, when the developer of the present invention is prepared according to the melt-kneading method, it is important that the kneading conditions should be selected so that the dielectric constant is within the above-mentioned range.

In order to disperse the finely divided magnetic material in the particulate form uniformly in the resin medium, it is preferred that the particle size distribution of the finely divided magnetic material be within the above-mentioned range. In the present invention, this uniform dispersion of the finely divided magnetic material can also be attained by coating the finely divided magnetic material with a fatty acid, a resin acid or a metal soap thereof or a surface active agent in an amount of 0.1 to 30% by weight based on the magnetic material.

Known auxiliary components for developers may be added to the developer components according to known recipes prior to kneading and granulation of the developer components. For example, in order to improve the hue of the developer, one or more of pigments such as carbon black and dyes such as Nigrosine may be added in an amount of 0.5 to 5% by weight based on the entire developer. Furthermore, in order to extend the developer, a filler such as calcium carbonate or finely divided silica may be incorporated in an amount of up to 20% by weight based on the total developer. In order to control the charge of the developer, an oil-soluble dye such as Oil Black or Oil Blue may be added in an amount of 0.1 to 3% by weight based on the entire developer. When the developer is used for the fixing method using a heating roll, an offset preventing agent such as a silicone oil, a low-molecular-weight olefin resin or a wax may be used in an amount of 2 to 15% by weight. When the developer is used for the fixing method using a pressing roll, a fixing property-improving agent such as paraffin wax, an animal or vegetable wax, a higher fatty acid or a fatty acid amide may be added in an amount of 5 to 30% by weight based on the total developer. Furthermore, a flow-improving agent such as finely divided polytetrafluoroethylene may be added in an amount of 0.1 to 1.5% by weight based on the total developer so as to prevent cohesion of the developer particles and improve the flowability of the developer particles.

Formation of developer particles may be carried out according to optional methods such as a pulverization method, a pulverization-melt granulation method, a spray granulation method and the like. When the pulverization method is adopted, the kneaded composition of the developer components is cooled and pulverized, and classification is carried out according to need. It is ordinarily preferred that the size of the developer particles be in the range of 5 to 35 microns, though the preferred particle size differs to some extent depending on the desired resolving power. When the developer of the present invention is composed of particles having an indeterminate shape, which are prepared by the kneading-pulverization method, the transfer efficiency is further increased and the image sharpness is further improved.

In the electrostatic photographic reproduction process using the developer of the present invention, an electrostatic latent image is formed according to any of known methods. For example, an electrostatic latent image can be formed by uniformly charging a photoconductive layer on an electrically conductive substrate and subjecting the charged photoconductive layer to imagewise exposure.

The surface of the substrate having the so formed electrostatic latent image is caused to fall in contact with a magnetic brush of the above-mentioned one-component type magnetic developer of the present invention, whereby a visible image of the developer is formed.

Then, the image of the developer formed on the substrate is caused to fall in contact with a transfer sheet and corona discharge of the same polarity as that of the electrostatic latent image is effected from the back of the transfer sheet, whereby the image of the developer is transferred onto the transfer sheet.

It has been found that the one-component type magnetic developer of the present invention shows reproduction characteristics quite different from those of the known conventional one-component type magnetic developers in the above-mentioned electrostatic photographic reproduction process.

FIG. 1 of the accompanying drawing shows the relation between the density of an image of the original and the density of a copied image on a transfer sheet. This relation observed when frictional charge caused between a developer and a substrate is utilized according to the process disclosed in Japanese patent application Laid-Open Specification No. 62638/75 is plotted to obtain a curve A in FIG. 1. This curve is upwardly convex and is saturated at a low density. The above relation observed when dielectric polarization of a developer is utilized According to the teaching of Japanese patent application Laid-Open Specification No. 133026/76 is plotted to obtain a curve B. This curve is upwardly concave and is saturated at a low density. From these curves A and B, it is seen that in each of these two conventional developers, attainment of a linear proportional relation in a broad region cannot be expected and it is difficult to reproduce a half-tone image or obtain a transferred image having a high density. In contrast, when a developer satisfying the requirements of the electrostatic capacity and dielectric constant specified in the present invention is used, in a curve C formed by plotting the density of the original image and the density of the transferred image, a substantially linear proportional relation is manifested in a relatively broad region. Thus, it will readily be understood that when the developer of the present invention is used, it is possible to reproduce a half-tone image or obtain a transferred image having a high density.

In the present invention, fixation of the transferred image can be performed according to any of known methods such as the method using a heating roller, the method using a flash lamp and the method using a pressing roller, and a suitable method is selected according to the kind of the developer.

The present invention will now be described in detail with reference to the following Examples that by no means limit the scope of the invention.

EXAMPLE 1

A magnetic toner (toner A) was prepared according to procedures described in Example 5 of Japanese patent application Laid-Open Specification No. 62638/75. The composition of this toner was as follows:

| | |
|---|---|
| Piccolastic E-125 (styrene homopolymer resin having a molecular weight of 6000 and manufactured by Esso Standard) | 25 parts |
| Beckside 1110 (maleic acid-modified natural resin manufactured by Dainippon Ink Kagaku) | 15 parts |
| Magnetic Iron Oxide BL-500 (manufactured by Titan Kogyo) | 50 parts |
| Orazole Black P (manufactured by Ciba) | 2.5 parts |

A magnetic toner (toner B) was prepared according to procedures described in Experiment 2 of Japanese patent application Laid-Open Specification No. 133026/76. This toner comprised 30 parts of a styrene resin, 66 parts of particles having a particle size of 0.05 to 0.1μ and 4 parts of stearic acid.

A toner of the present invention was prepared in the following manner.

First, 55 parts of magnetitie ($Fe_3O_4$, Black Iron BM manufactured by Toyo Shikiso Kogyo) and 45 parts of a vinyltoluene/2-ethylhexyl acrylate copolymer (molar ratio=17/3; weight average molecular weight=83,000) were melt-kneaded by using a two-roll mill, and the kneaded mixture was naturally cooled and roughly pulverized by a cutting mill to form coarse particles having a size of 0.5 to 2 mm. Then, the particles were finely pulverized by a jet mill and classified by a zigzag classifier to obtain a magnetic toner having a particle size of 10 to 30μ.

By using the so prepared 3 toners, the copying test was carried out in the following manner.

In a copying machine using a selenium drum as a photosensitive material, the magnetic toner was applied to a developing roller having a magnet built therein through a non-magnetic member, and the distance between the magnetic roller and a spike cutting plate was adjusted to 0.3 mm and the distance between the surface of the photosensitive material and the developing roller was adjusted to 0.5 mm. The developing roller was moved in the same direction as the moving direction of the photosensitive material at a speed 2 times the moving speed of the photosensitive material. Under these conditions, charging, exposure, development and transfer were conducted. High quality paper having a thickness of 80μ was used as a transfer sheet. Results of the copying test and physical properties of the toners are shown in Table 1. The image density was measured on a solid black portion.

TABLE 1

| Magnetic Toner | Volume Resistivity ($10^{14}$Ω-cm) | Electrostatic Capacity (PF) | Dielectric Constant | Image Density | Sharpness (image quality) |
|---|---|---|---|---|---|
| A | 6.4 | 15.1 | 7.74 | 0.76 | blurring, Δ |
| B | 2.8 | 10.4 | 5.33 | 0.83 | blurring, Δ |
| magnetic toner of present invention | 4.3 | 8.9 | 4.56 | 1.52 | no blurring, ⊚ |

Note
⊚very clear image
Δ broadening by blurring

In order to improve the image density in the case of the toners A and B, the distance between the surface of the photosensitive material and the developing roller was shortened. However, fogging or blocking of the toner was caused, and continuous reproduction was impossible. When the toner of the present invention was used, an image having a high density and being free of fogging or edge effect was obtained.

At the copying test using a grey scale of Kodak Co., 5 stages were confirmed in the toner A and 4 stages were confirmed in the toner B. In contrast, 9 stages were confirmed in the toner of the present invention.

The above-mentioned composition of the present invention was formed into a spherical toner according to the spray-drying method. When the copying test was carried out by using this spherical toner, an image having a high contrast and being substantially free of blurring was obtained.

This spherical toner had an electrostatic capacity of 11.5 PF and a dielectric constant of 5.90.

EXAMPLE 2

A magnetic toner (toner D) was prepared according to procedures described in Example 2 of Japanese patent application Laid-Open Specification No. 92137/75. The composition of this toner was as follows:

| | |
|---|---|
| Pliolite VT (vinyltoluene/butadiene copolymer having a weight average molecular weight of 152,000 and manufactured by Goodyear) | 100 parts |
| Orazole Black 2RG (manufactured by Ciba) | 1 part |
| Carbon Black #44 (manufactured by Mitsubishi Kasei) | 3 parts |
| EPT 500 ($Fe_3O_4$ manufactured by Toda Kogyo) | 30 parts |

A toner of the present invention was prepared in the same manner as described in Example 1 by using 60 parts of magnetite ($Fe_3O_4$, Black Iron BL-500 manufactured by Titan Kogyo) and 40 parts of a vinyltoluene/-butadiene copolymer (molar ratio=6/1, weight average molecular weight=78,000). The copying test was carried out in the same manner as described in Example 1 by using the so prepared 2 toners. Obtained results and physical properties of the toners are shown in Table 2.

TABLE 2

| | Magnetic Toner D | Toner of Present Invention |
|---|---|---|
| Volume Resistivity | 5.2 × $10^{14}$Ω-cm | 3.9 × $10^{14}$ Ω-cm |
| Electrostatic Capacity (PF) | 7.7 | 9.0 |

TABLE 2-continued

| | Magnetic Toner D | Toner of Present Invention |
|---|---|---|
| Dielectric Constant | 3.95 | 4.62 |
| Image Density | 1.50 | 1.49 |
| Sharpness (image quality) | thickening of printed letters, difficult to read, Δ | no blurring, ⊚ |
| Fog Density | 0.32 | no fog |

Although the density of the image formed by using the toner D was high, fogging was caused. When the distance between the surface of the photosensitive material and the developing roller was broadened by 0.1 mm so as to prevent occurrence of fogging, the image density was reduced to 0.65 though occurrence of fogging was prevented. Furthermore, the magnetic toner D was poor in the cleaning property and was left adherent on the surface of the selenium drum. The remaining toner on the drum could be removed when the brushing operation was conducted several times.

EXAMPLE 3

A magnetic toner was prepared from magnetite ($Fe_3O_4$, BL-500 manufactured by Titan Kogyo) and a thermoplastic resin (styrene/2-ethylhexyl acrylate copolymer having a weight average molecular weight of 139,000) in the following manner.

By using a 2-roll mill, 55 parts of magnetite and 45 parts of the resin were melt-kneaded at 160° C. for 20 minutes and the kneaded mixture was pulverized to form a toner having an indeterminate shape (particle size range of from 10 to 30μ). This toner was characterized by a volume resistivity of $7.0\times10^{14}$ Ω-cm, an electrostatic capacity of 8.51 PF and a dielectric constant of 4.36. When the copying test was carried out in the same manner as described in Example 1 by using this toner, an image having a density of 1.50 was obtained without blurring.

Magnetic toners were prepared in the same manner as described above by using a styrene/butyl methacrylate copolymer having a weight average molecular weight of 40,000 or 60,000 instead of the above-mentioned resin. In case of these magnetic toners, the image density was as low as 0.55 or 0.63 and no good results were obtained, though the electrostatic capacity and dielectric constant were within the ranges specified in the present invention.

EXAMPLE 4

In the same manner as described in Example 1, magnetic toners having a composition shown below were prepared by using magnetite ($Fe_3O_4$, KN-320 manufactured by Toda Kogyo) and a thermoplastic resin (vinyltoluene/2-ethylhexyl acrylate/butadiene terpolymer, molar ratio=16/1/3, weight average molecular weight=85,500).

Toner (4): 75 parts of magnetite and 25 parts of resin
Toner (5): 65 parts of magnetite and 35 parts of resin
Toner (6): 55 parts of magnetite and 45 parts of resin
Toner (7): 45 parts of magnetite and 55 parts of resin
Toner (8): 35 parts of magnetite and 65 parts of resin The copying test was carried out in the same manner as described in Example 1 by using these toners. Obtained results and physical properties of the toners are shown in Table 3.

TABLE 3

| Magnetic Toner | Volume Resistivity (Ω-cm) | Electrostatic Capacity (PF) | Dielectric Constant | Image Density | Sharpness (image quality) | Fog Density |
|---|---|---|---|---|---|---|
| (4) | $9.0\times10^{13}$ | 10.9 | 5.60 | 0.50 | no blurring, Δ | no fog |
| (5) | $1.5\times10^{14}$ | 9.32 | 4.78 | 0.81 | no blurring, ○ | no fog |
| (6) | $5.2\times10^{14}$ | 8.60 | 4.41 | 1.37 | no blurring, ⊚ | no fog |
| (7) | $8.3\times10^{14}$ | 8.09 | 4.15 | 1.58 | no blurring, ○ | 0.20 |
| (8) | $1.0\times10^{15}$ | 7.79 | 3.99 | 1.60 | thickening of letters, Δ | 0.30 |

From the results shown in Table 3, it is seen that good results are obtained when 45 to 65 parts of magnetite and 35 to 55 parts of the resin components are used.

Example 5

In the same manner as described in Example 1, a magnetic toner was prepared by using 55 parts of magnetite ($Fe_3O_4$, Black Iron B6 manufactured by Toyo Shikiso), 37.5 parts of a styrene/butadiene copolymer (molar ratio=6/1, weight average molecular weight of 132,000) and 7.5 parts of low-molecular-weight polypropylene (Viscol 550-P manufactured by Sanyo Kasei). The copying test was carried out by using this toner and fixation was carried out by using a heating roll. The obtained image was very sharp and clear and free of fogging or blurring and had a density of 1.64.

The above magnetic toner was characterized by a volume resistivity of $5.8\times10^{14}$ Ω-cm, an electrostatic capacity of 9.0 PF and a dielectric constant of 4.62.

What we claim is:

1. A carrierless magnetic developer which comprises a binder medium and 45 to 65% by weight, based on the total developer, of fine particles of a magnetic material dispersed in the binder medium, said binder medium consisting essentially of a copolymer of (a) at least one aromatic vinyl monomer with (b) at least one acrylic monomer or a terpolymer of (a) at least one aromatic vinyl monomer, (b) at least one acrylic monomer and (c) a conjugated diolefin and having a weight average molecular weight of 75,000 to 150,000, the amount of the aromatic vinyl monomer being 20 to 95% by weight based on the binder medium, wherein the electrostatic capacity as determined under conditions of an electrode spacing of 0.65 mm, an electrode sectional area of 1.43 $cm^2$ and an electrode load of 105 $g/cm^2$ is 7.8 to 11.7 PF (picofarad), the dielectric constant is 4 to 5 as determined under the above conditions and the electric resistance is at least $5\times10^{13}$ Ω-cm as determined under the above conditions; whereby the developer can develop a latent electrostatic image on a substrate without forcibly charging the developer particles by corona discharge and without frictionally charging the developer particles by causing strong sliding contact between the developer and the substrate resulting from rotating the developer in a direction opposite to the moving direction of the substrate.

2. A magnetic developer which comprises a binder medium and fine particles of a magnetic material dispersed in the binder medium, said binder medium and said magnetic material being present in amounts of 35 to 55 parts by weight and 45 to 65 parts by weight, respectively, based on 100 parts by weight of the sum of the binder medium and the magnetic material, said binder medium being a copolymer of (a) at least one aromatic vinyl monomer with (b) at least one acrylic monomer or a terpolymer of (a) at least one aromatic vinyl monomer, (b) at least one acrylic monomer and (c) a conjugated diolefin and having a weight average molecular weight of 75,000 to 150,000, the amount of the aromatic vinyl monomer being 20 to 95% by weight based on the binder medium, wherein the electrostatic capacity of said developer as determined under conditions of an electrode spacing of 0.65 mm, an electrode sectional area of 1.43 $cm^2$ and an electrode load of 105 $g/cm^2$ is 8 to 11 PF (Picofarad), the dielectric constant of said developer is 4.1 to 5.1 as determined under the above conditions and the electric resistance of said developer is at least $5\times10^{13}$ Ω-cm as determined under the above conditions.

3. A magnetic developer as set forth in claim 1 or 2 wherein the weight average molecular weight of said polymer is 78,000 to 140,000.

4. A magnetic developer as set forth in claim 1 or 2 wherein the electrostatic capacity is 8 to 11 PF, the dielectric constant is 4.1 to 5.1 and the electric resistance is $1\times10^{14}$ to $1\times10^{16}$ Ω-cm.

5. A magnetic developer as set forth in claim 1 or 2 wherein the amount of the finely divided magnetic material is in the range of 50 to 60% by weight, based on the total developer.

6. A magnetic developer as set forth in claim 1 or 2 wherein the magnetic material has a particle size distribution such that particles having a size larger than 0.5μ occupy less than 20% of the total particles and particles having a size smaller than 0.3μ occupy less than 20% of the total particles.

7. A magnetic developer according to claim 1 or 2 wherein the amount of the aromatic vinyl monomer is from 45 to 93% by weight, based on the total binder medium.

8. A magnetic developer according to claim 1 or 2 wherein the fine particles of the magnetic material are coated with a fatty acid, a resin acid or a metal salt thereof or a surface-active agent in an amount of 0.1 to 30% by weight, based on the magnetic material.

9. A magnetic developer according to claim 1 or 2 wherein the size of the developer particles is in the range of 5 to 35μ.

10. A magnetic developer according to claim 1 or 2 wherein said binder medium is a copolymer of vinyl toluene and 2-ethylhexyl acrylate; a copolymer of styrene and 2-ethylhexyl acrylate; or a terpolymer of vinyl toluene, 2-ethylhexyl acrylate and butadiene.

* * * * *